Figure 1:
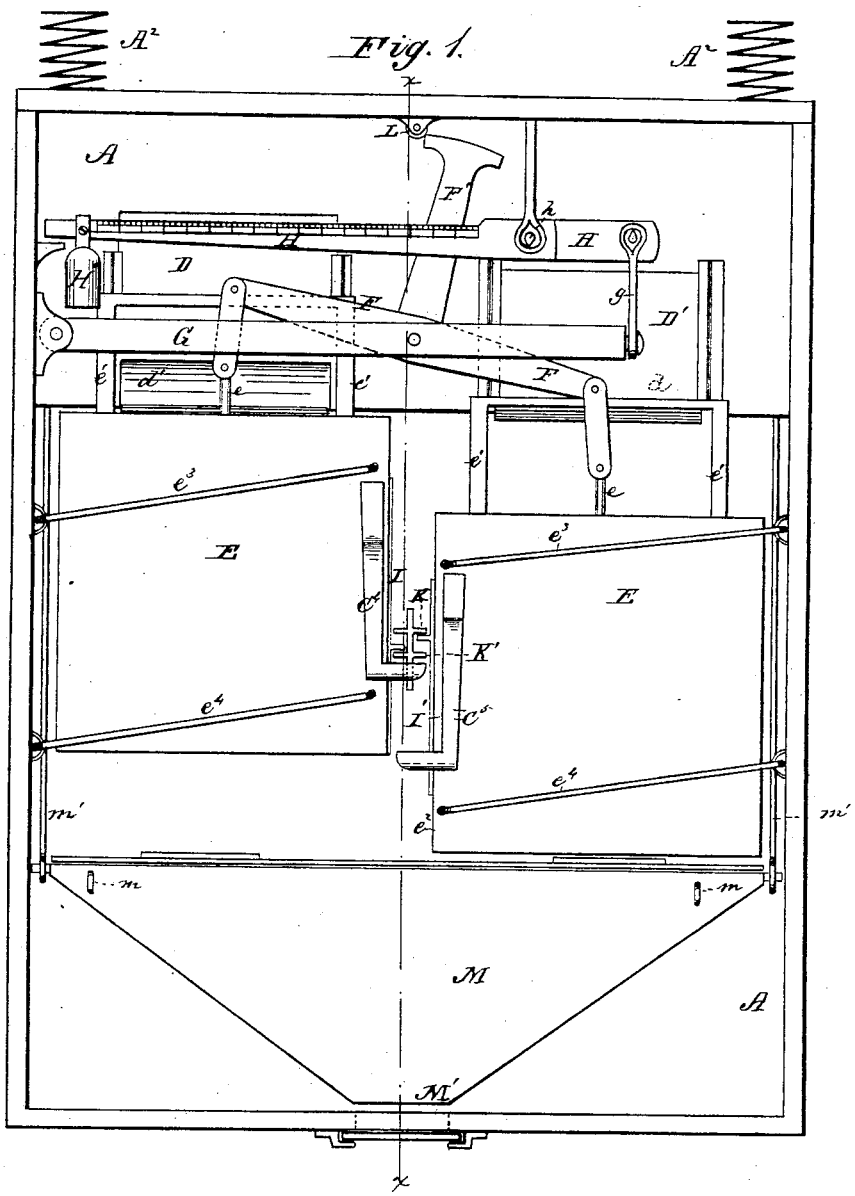

(Model.)

2 Sheets—Sheet 1.

R. R. JAMES & M. N. LYNN.
Grain Meter.

No. 238,122. Patented Feb. 22, 1881.

WITNESSES:
W. W. Hollingsworth
John C. Kenon

INVENTOR:
R. R. James
M. N. Lynn
BY
ATTORNEYS.

(Model.)
2 Sheets—Sheet 2.
R. R. JAMES & M. N. LYNN.
Grain Meter.
No. 238,122.
Patented Feb. 22, 1881.
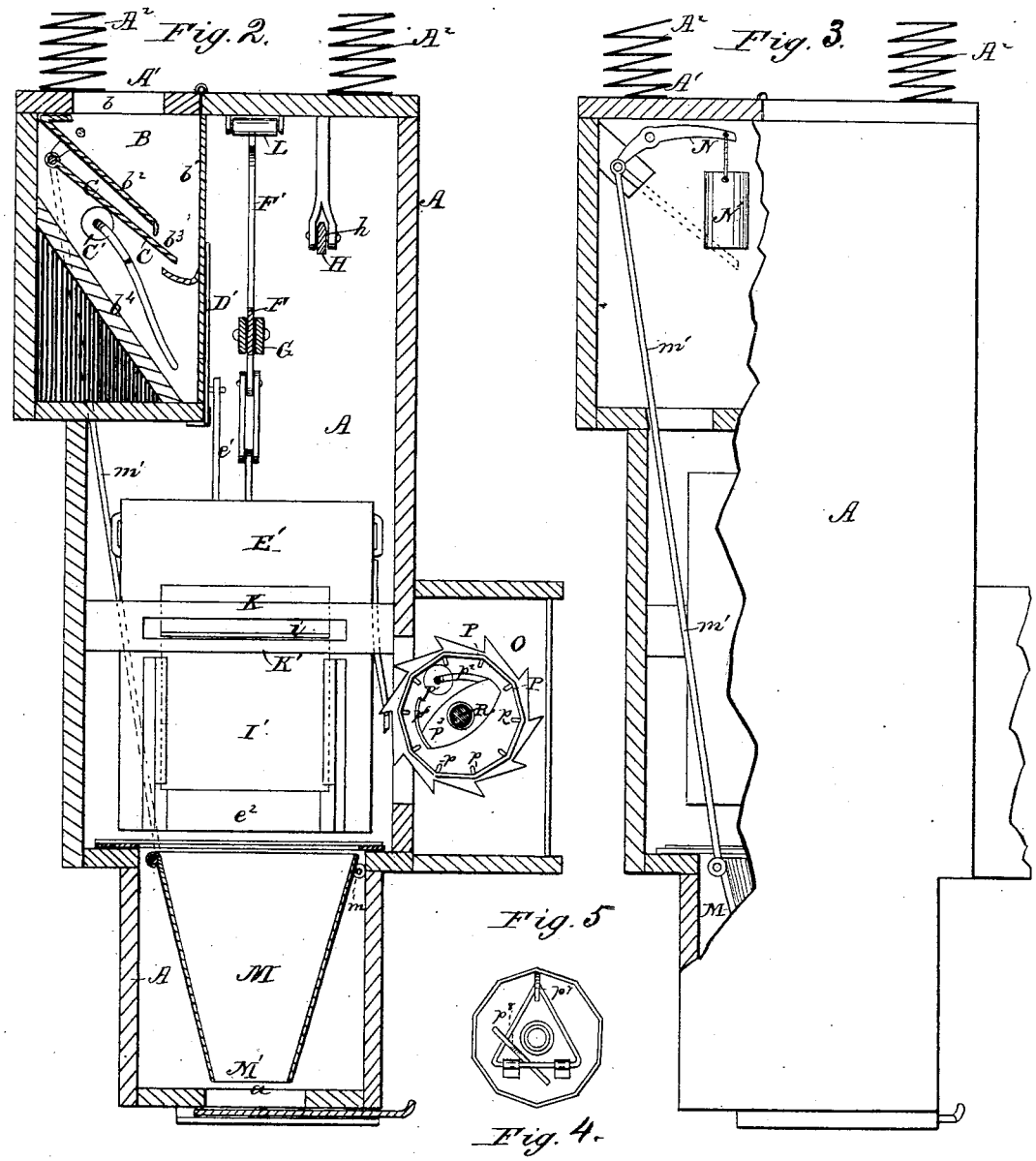
WITNESSES:
INVENTOR:
ATTORNEYS.

UNITED STATES PATENT OFFICE.

REUBEN R. JAMES AND MIRABEAU N. LYNN, OF RISING SUN, INDIANA; SAID LYNN ASSIGNOR OF ONE-HALF TO BRADFORD MILL COMPANY, OF CINCINNATI, OHIO.

GRAIN-METER.

SPECIFICATION forming part of Letters Patent No. 238,122, dated February 22, 1881.

Application filed May 10, 1880. (Model.)

*To all whom it may concern:*

Be it known that we, REUBEN R. JAMES and MIRABEAU N. LYNN, of Rising Sun, in the county of Ohio and State of Indiana, have invented a new and Improved Grain-Meter; and we do hereby declare that the following is a full, clear, and exact description of the same.

Our invention relates to apparatus for weighing and measuring and registering the amount of grain that passes through it by means of apparatus actuated solely by the weights of the grain, and thereby be automatic in its operation; and the improvement primarily consists in employing double balanced measuring-buckets suspended from a balance-beam that is supported upon a vibrating lever operated upon alternately by the weight of the grain in one of the buckets, and the weight of a scale-beam connected with the free end of the vibrating lever, to hold the receiving-bucket in its raised position until the proper weight or quantity of grain shall have been delivered to it, when it will be allowed to drop of its weight at once in a peculiar manner, and in so doing close the receiving-valve and open the discharge-valve connected to the full bucket, to allow the grain to discharge therefrom, while the other measuring-bucket is by the same movement raised and acts upon its receiving and delivery valves—to respectively open the one and close the other, and become, in turn, the receiving-bucket—the operation above described to continue so that one bucket will operate upon the other so long as grain is allowed to pass the receiving-valves.

In order to prevent the grain from being choked or smothered in its passage through the discharge pipes or openings, and thereby stop the further operation of the buckets, the improvement further consists in suspending a vibrating discharge-hopper upon pivots below the measuring-buckets to receive the grain that is discharged from them, and in connecting the vibrating ends of the hopper by rods with counterbalance-weights, and a sliding gate arranged in the grain-chute above the valves that open into the measuring-buckets, in such manner that an excessive weight of grain upon the discharge-hopper will close the valve across the grain-chute, so that no more grain will be admitted to the measuring-buckets until the discharge-hopper shall have been relieved of its excessive weight.

In order that an accurate account and registry may be kept of the number of bushels or weight of grain that has passed through the machine, a novel registering mechanism has been employed; and the improvement consists in providing a number of numeral-wheels, which will be made to revolve by a peculiar form of ratchet and locking mechanism, to locate and fix securely one numeral after another in regular order opposite the open face of the register-box, and in connecting these wheels upon the shaft and with each other by peculiar mechanism, which will allow the first wheel of the series to make a complete revolution to each one-tenth part of a revolution of the next adjoining wheel, and so on from one to the other, as will hereinafter more fully appear.

Our invention finally consists in suspending the meter from springs, which will admit of a slight vibration of the machine in weighing, where there is a jar, without affecting the accuracy of the machine's operation.

Figure 6:
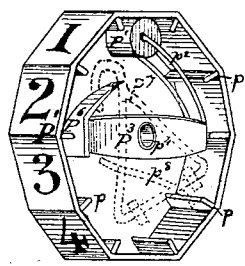

In the accompanying drawings, Figure 1 is a front elevation of our improved machine with the face of the casing removed; Fig. 2, a transverse vertical section through the weighing-machine and register-box in the line $x\ x$ of Fig. 1. Fig. 3 is an end elevation of the machine with a portion of its casing broken away; Fig. 4, a longitudinal section through the register-box; Fig. 5, a face view of the reverse side of one of the numeral-wheels of the register detached; and Fig. 6 is a perspective view of one of the register-wheels, with the spring-hook of another wheel, shown in dotted lines.

The meter is inclosed within a rectangular shell, A A, having a removable face, to admit of access to the weighing mechanism for examination, adjustment, &c., and has also a hinged lid, A', upon the upper and near side of the casing, to cover the grain-receiving hopper B. The lid A' is formed with a rectangular opening through it, to allow the grain to pass into the meter-casing from the grain-tube or spouting to which the meter is connected.

The hopper B is of triangular shape, the top $b$ and front side, $b'$, of which are at right angles to each other, and the third side, $b^2$, forming the bottom, extends diagonally from the outer corner of the top toward the lower corner of the front side or wall of the hopper. The bottom plate, $b^2$, does not quite reach the lower corner of the front side, $b'$, and the lower edge of the said side $b'$ is turned under and up toward the lower edge of the bottom plate, $b^2$, to leave an opening, $b^3$, between them, through which the grain may pass from the hopper B on toward the weighing-buckets of the meter.

A sliding gate, C, arranged parallel with and directly below the bottom plate, $b^2$, rests upon rollers $c'$ and slides into a basin or pocket to control the opening $b^3$, as hereinafter described.

A chute-board, $b^4$, is arranged nearly parallel with and a little below the bottom plate, $b^2$, and gate C, to leave a space between them, which space is divided into two branching channels, that extend to the valve-openings $d$ $d'$, which openings are regulated by vertically-sliding valves D D', that work in guides upon the front plate, $b'$. The valve-openings $d$ $d'$ are respectively located directly above the weighing and measuring buckets E E', so that the grain from the hopper B is conducted to them.

The buckets E E' are suspended from the opposite ends of a balance-beam, F, which is pivoted midway of its length to a vibrating beam, G, that extends horizontally across the meter, and is supported at one end by a hinged connection to the side wall of the meter-casing, so that the other end of the lever will be allowed a limited vibration. The free end of the lever G is connected by link $g$ with the lifting end of a weighing or scale beam, H, that is also arranged horizontally within the casing and located directly above the beam G. The scale-beam H is pivoted at $h$ $h$ to brackets secured to the casing, and is graduated upon its face, to indicate the number of pounds in the measure required. Suitable weights, H', regulate the balance, so only a given weight of grain will be allowed to enter the bucket at each movement. The buckets E E' are suspended from the balance-beam F by rods $e$ $e$, secured to the buckets in a suitable manner. The upper rim of each of the buckets has arms $e'$ $e'$, that connect the bucket with its valve D or D', so that when the bucket rises the valve will be opened, and when it falls the valve will be closed into a pocket or basin formed by the bottom projecting and being turned up. Each of the buckets has delivery-valves I I', that regulate the openings $e^2$ $e^2$ in the lower part and upon the inner and adjacent walls of the buckets, so that the valve-openings of the buckets will come directly opposite each other. A frame formed of two horizontal bars, K K', one arranged above the other, is secured to the casing, so that they will pass between the buckets and be located close to each of the adjacent sides of the buckets. The delivery-valves I I' have flanges $i$ $i$ projecting horizontally from their outer face, and the said flanges pass between the bars K K', so that the valve will be allowed only a limited vertical movement, and the bars K K' will serve to raise the valves I I' and expose the openings $e^2$ $e^2$ when its respective bucket goes down, and close the valve when the bucket is lifted.

In order to secure a prompt opening and closing of the valves at the moment when the exact weight of grain shall be held in the receiving-bucket, the balance-beam F is provided with an arm, F', extending at right angles from the beam at a point directly opposite its pivotal center. The upper end of the arm F' bears upon a friction roller or pin, L, secured to the inner side of the cover of the casing, to interlock in a peculiar manner with the lever F' upon either side and hold the receiving-bucket in its raised position until the full weight of grain has been admitted to the bucket. This movement is accomplished by the combined action of the balance-beam F, vibrating beam G, and weighted scale-beam H. The weighted beam H supports the free end of the vibrating lever G in its raised position, so that the upper end of the arm will bear against the side of the roller opposite the receiving-bucket, and will be held there until the weight of grain in the bucket raises the weight until the end of the arm shall have cleared the roller L, and being then supported only by the weight the bucket will instantly fall and the empty bucket will be at once raised, and the receiving and delivery valves of the buckets will be operated at the same moment, to cause an accurate admission and cutting off of the grain to the weighing-buckets. The arm F' of the balance-beam F will then swing to the opposite side of the roller, and be caught behind it to support the opposite bucket in its raised position in a similar manner.

The buckets E E' are held in place so that they will move easily up and down without jarring or rubbing against other parts of the device by means of link-rods $e^3$ $e^4$, hinged to the inner surface of the side walls of the casing. This device greatly prevents rattling and secures a light movement of the buckets.

The delivery-hopper M is located directly below the buckets, to receive all of the grain that is discharged from them, and is pivoted at its front corners, $m$ $m$, so that its opposite side may vibrate freely upon its pivots. The bottom of the hopper has a discharge-opening, M', which comes directly opposite a corresponding opening, $a$, in the bottom of the casing. The vibrating or rear end of the hopper M is connected by rods $m'$ $m'$ with the opposite ends of the sliding gate C, that slides in the pocket and controls the admission of the grain to the receiving-spouts, and serves as a cut-off to partially arrest or entirely stop the operation of the meter, when the discharge-hopper is overloaded, until it shall have freed itself of its excessive weight of grain.

A weighted bell-crank lever, N, is pivoted to the sides of the hopper, and is connected with the joints between the gate C and rods $m'$ $m'$, so that the gate C and hopper M are both supported by the counterbalance-weights N', which may be additionally weighted to counterbalance any required weight of grain in the hopper, and when the amount of grain in the hopper shall exceed the force of the weights N' the hopper will tilt and close the valve C until the hopper M is relieved of its excessive weight, and prevent the grain from accumulating sufficiently to check or intercept the regular movement of the buckets.

The casing A is suspended from any permanent beam or framing by means of coiled springs $A^2$, two or four of which are preferably employed. Any jar or vibration given to the casing by the falling of the buckets or valves or any outside influences will be so reduced, cushioned by the springs, that no disarrangement of the registering mechanism is caused thereby.

The registering apparatus is inclosed in a separate casing, O, secured to the face of the casing A in a suitable manner.

The register is formed of a series of drum-wheels, P $P'$ $P^2$, secured to a permanent axle, R, so that they may freely turn thereon. The inner surfaces of the drums are divided by radially-projecting plates $p$ into ten compartments, and a roller, $p'$, secured to a spring-arm, $p^2$, attached to a stationary plate, $p^3$, is also secured to the axle R, so that as the drum is turned the roller will fall into the opposite compartments and arrest the further movement of the wheel. Each wheel has the first ten numerals marked upon its periphery, so that one of the numerals will come opposite each of the compartments, and as the roller falls into the compartment the corresponding number upon the wheel will be accurately located opposite the face-plate of the register-box O. The plates $p^3$ are either permanently keyed upon the axle R, or they may be, as in this instance, provided with collars or hubs $p^4$, which will pass through the hub of the register-drum and form a journal, upon which the drums may freely turn. The collars or hubs of all of the plates pass entirely through the wheel-hubs, so that the collars $p^4$ will bear against each other and form one continuous hollow tube from one end of the axle to the other. One end of this tube will bear against the inner surface of the casing O, and the other end will be pressed against by a collar, $p^5$, that passes through the casing O, and is held with sufficient pressure against the hub-tube $p^4$ to prevent all of the plates from turning. A metal plate, S, secured to the outer side of the casing by screws $s$ $s$, is forced against the outer end of the tube, or may be secured by a bolt passing through the inner tube, $p^5$, to give the required pressure. The unit-wheel of the registering mechanism has ten notched teeth secured upon its rim, to correspond with the number of compartments and numerals upon the wheel, and project through the casing O of the register, and also through the casing A of the meter at a point directly opposite the central line between the buckets E E' of the meter. Spring-hooks $c^4$ $c^5$ upon each of the buckets engage with one of the notched teeth of the wheel P as each bucket is lifted.

In order to move the second or "tens" wheel from one compartment or numeral to the next to each full revolution of the unit-wheel, a horn, $p^6$, is secured to one end of the plate $p^3$ upon the unit-wheel, which projects at its point somewhat within the next or "unit" wheel. The units-wheel is provided with a hook, $p^7$, upon its face, opposite the tens-wheel, which projects somewhat within the rim of tens-wheel. The hook $p^7$ forms a part of a triangular wire or plate that is hinged to the face of the drum or number wheel, and is held against the face of the plate by a spring, $p^8$. When the unit-wheel revolves until the spring-hook $p^7$ shall come opposite the horn $p^6$, the hook will be drawn into the next or tens wheel and press against one of the plates $p$, and the coupled wheels will move together until the hook $p^7$ passes beyond the horn $p^6$, when its spring will withdraw it from the adjoining wheel and the unit-wheel will revolve alone, as clearly shown by the hook $p^7$ in dotted lines, passing over the horn $p^6$ in Fig. 6. The horn $p^6$ is only of sufficient length to allow its wheel to be moved one-tenth of a revolution. The hundreds, thousands, and other wheels of the register mechanism are connected with the wheel of the next lowest denomination in a similar manner, so that the figures exposed upon the register will be raised a single number at each upward movement of a bucket and register the exact number of movements of the buckets. The scale-beam will indicate the number of pounds to the bucket and the number of pounds to the bushel.

The parts employed for intermittently revolving and locating the rollers relatively to each other are closely grouped around the hub or axle of the drum, and are completely inclosed and protected by it. Furthermore, the rims of the drums are not cut away to allow the locating and actuating rollers to pass through to the outside, so that with our form of construction and arrangement the outer surfaces of the drums are not marred.

In practice we make the first drum in the register have on its face $\frac{1}{4}, \frac{1}{2}, \frac{3}{4}, 0, \frac{1}{4}, \frac{1}{2}, \frac{3}{4}, 0$, in which case two hooks and eight equal sides are employed; or it may be provided with eight equal sides and display the numerals $\frac{1}{8}, \frac{1}{4}, \frac{3}{8}, \frac{1}{2}, \frac{5}{8}, \frac{3}{4}, \frac{7}{8}, 0$ in regular order, in which case but one hook is employed.

The operation of the meter and register will be readily understood from the foregoing.

We claim as our invention and desire to secure by Letters Patent—

1. In a grain-meter, the combination of the measuring-buckets, suspended from the opposite ends of a balance-beam, the vibrating beam upon which the balance-beam is pivoted, hinged at one end of the casing of the meter and supported at the other end by a weighted scale-beam, the bucket being connected to and provided with suitable receiving and delivery valves, so that the bucket will alternately operate, substantially as described.

2. In a grain-meter, the combination of the measuring-buckets, balance-beam pivoted to a projecting arm, the vibrating fulcrum-beam, the weighted scale-beam, and a tripping block, pin, or roller secured to the casing, and arranged in such manner that it will hold the receiving-bucket in its raised position until it is properly filled, in the manner and for the purpose substantially as described.

3. In a grain-meter, the combination of the measuring-bucket, suspended from scale-beams arranged to alternately rise and fall, and vertically-moving receiving-valves secured to the lower portion of the sides of the receiving-hopper, operated upon by brackets secured to the buckets, to lift the valve as the bucket rises and automatically receive the grain, substantially as described.

4. In a grain-meter, the combination of the measuring-buckets, suspended from scale-beams arranged to alternately rise and fall, and vertically-moving discharge-valves secured to guides upon the lower and inner sides of the buckets, and a frame permanently secured to the casing of the meter, to embrace projecting lugs upon the valves, to open and close the valves, respectively, upon the buckets as they rise and fall, substantially as described.

5. In a grain-meter, the combination of the vertically-moving measuring-buckets, suspended from scale-levers, a vibrating discharge-hopper arranged beneath the measuring-buckets and pivoted upon one side of the casing-rods, to connect the free side of the hopper to a vertically-moving cut-off valve arranged in the grain-chute above the receiving-valves, substantially as and for the purpose described.

6. A grain-meter provided with weighing or measuring buckets that vibrate vertically as they are filled and emptied within a casing that is suspended from a fixed support by springs, to admit of a limited vibration of the meter without affecting its accuracy, substantially as described.

7. In a registering apparatus, the combination of a series of intermittently-revolving drums, P P', the pawl or roller plate $p^3$, provided with hubs $p^4$, that form journals upon which the rollers revolve and bear against each other, to form a continuous hollow shaft, together with the collar $p^5$ and the presser-plate S, for clamping the hubs one against the other, to prevent them from turning with the drums, and a fixed axle, R, that passes through the tube formed of hubs $p^4$, to hold the parts together, substantially as and for the purpose described.

REUBEN RODNEY JAMES.
MIRABEAU NORMAN LYNN.

Witnesses:
JAS. HAINER,
JOHN H. JONES.